(12) United States Patent
Lee et al.

(10) Patent No.: US 10,004,051 B2
(45) Date of Patent: Jun. 19, 2018

(54) APPARATUS AND METHOD FOR CONTROLLING TRAFFIC OF ELECTRONIC DEVICE

(71) Applicant: Samsung Electronics Co., Ltd., Suwon-si, Gyeonggi-do (KR)

(72) Inventors: Ok-Seon Lee, Suwon-si (KR); Hyeon-Jin Kang, Seoul (KR); Sang-Jun Moon, Yongin-si (KR); Yong-Seok Park, Seoul (KR); Kang-Jin Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/470,323

(22) Filed: Mar. 27, 2017

(65) Prior Publication Data

US 2017/0201957 A1     Jul. 13, 2017

Related U.S. Application Data

(63) Continuation of application No. 14/596,748, filed on Jan. 14, 2015, now Pat. No. 9,609,596.

(30) Foreign Application Priority Data

Jan. 14, 2014 (KR) .......................... 10-2014-0004658

(51) Int. Cl.
| | |
|---|---|
| *G08C 17/00* | (2006.01) |
| *H04W 56/00* | (2009.01) |
| *H04W 52/02* | (2009.01) |
| *H04W 28/02* | (2009.01) |
| *H04W 4/00* | (2018.01) |
| *H04W 4/14* | (2009.01) |
| *G06F 21/55* | (2013.01) |

(Continued)

(52) U.S. Cl.
CPC .......... *H04W 56/0015* (2013.01); *G06F 9/00* (2013.01); *G06F 21/554* (2013.01); *H04W 4/008* (2013.01); *H04W 4/14* (2013.01); *H04W 28/0215* (2013.01); *H04W 52/0229* (2013.01); *H04L 67/1095* (2013.01); *H04L 67/325* (2013.01); *H04W 40/22* (2013.01); *Y02B 60/50* (2013.01)

(58) Field of Classification Search
CPC ... H04W 56/0015; H04W 4/14; H04W 4/008; H04W 52/0229; H04W 28/0215; H04W 40/22; G06F 9/00; G06F 21/554; Y02B 60/50; H04L 67/1095; H04L 67/325
See application file for complete search history.

(56) References Cited

U.S. PATENT DOCUMENTS

| | | | |
|---|---|---|---|
| 8,517,896 B2 * | 8/2013 | Robinette | A63B 24/00 377/24.2 |
| 8,825,836 B1 * | 9/2014 | Gibson | H04L 51/24 455/412.2 |

(Continued)

*Primary Examiner* — Clemence Han
(74) *Attorney, Agent, or Firm* — Jefferson IP Law, LLP

(57) ABSTRACT

An apparatus and a method for controlling traffic of a second electronic device, which interworks with a first electronic device, in the first electronic device is provided. The method includes detecting occurrence of an event which needs to be notified to the second electronic device, determining a time to notify the occurrence of the event based on a driving time of the second electronic device, and transmitting an event occurrence notification signal to the second electronic device at the determined notification time.

12 Claims, 15 Drawing Sheets

(51) Int. Cl.
  *G06F 9/00* (2006.01)
  *H04L 29/08* (2006.01)
  *H04W 40/22* (2009.01)

(56) References Cited

U.S. PATENT DOCUMENTS

| | | | |
|---|---|---|---|
| 9,250,770 B2* | 2/2016 | Choi | G06F 3/0238 |
| 9,282,587 B2* | 3/2016 | Winkler | H04W 88/02 |
| 9,477,320 B2* | 10/2016 | Schaffer | G06F 3/02 |
| 9,531,501 B2* | 12/2016 | Linde | H04L 1/04 |
| 9,699,159 B2* | 7/2017 | Ignatchenko | H04L 63/08 |
| 2003/0151982 A1* | 8/2003 | Brewer | G04G 21/00 |
| | | | 368/46 |
| 2009/0161662 A1 | 6/2009 | Wu | |
| 2010/0069127 A1 | 3/2010 | Fiennes | |
| 2010/0283600 A1 | 11/2010 | Herbert et al. | |
| 2011/0150107 A1 | 6/2011 | Jung et al. | |
| 2011/0170464 A1 | 7/2011 | Sengottaiyan et al. | |
| 2012/0166833 A1 | 6/2012 | Iwai et al. | |
| 2013/0040610 A1* | 2/2013 | Migicovsky | H04L 1/1867 |
| | | | 455/412.2 |
| 2013/0078942 A1 | 3/2013 | Owens et al. | |
| 2013/0263284 A1 | 10/2013 | Black et al. | |
| 2014/0036876 A1* | 2/2014 | Li | H04W 24/04 |
| | | | 370/336 |
| 2014/0334271 A1 | 11/2014 | Park et al. | |
| 2015/0020081 A1 | 1/2015 | Cho et al. | |
| 2015/0123898 A1 | 5/2015 | Kim et al. | |
| 2015/0164391 A1 | 6/2015 | Hernandez-Rosas et al. | |
| 2015/0170482 A1 | 6/2015 | Soni et al. | |
| 2015/0312857 A1 | 10/2015 | Kim et al. | |
| 2015/0382322 A1* | 12/2015 | Migicovsky | H04L 1/1867 |
| | | | 455/458 |

\* cited by examiner

APPARATUS AND METHOD FOR CONTROLLING TRAFFIC OF ELECTRONIC DEVICE

CROSS-REFERENCE TO RELATED APPLICATION(S)

This application is a continuation application of prior application Ser. No. 14/596,748, filed on Jan. 14, 2015, which will issue as U.S. Pat. No. 9,609,596 on Mar. 28, 2017 and claims the benefit under 35 U.S.C. § 119(a) of a Korean patent application filed on Jan. 14, 2014 in the Korean Intellectual Property Office and assigned Serial number 10-2014-0004658, the entire disclosure of each of which is hereby incorporated by reference.

TECHNICAL FIELD

The present disclosure relates to controlling traffic of an electronic device. More particularly, the present disclosure relates to an apparatus and method for exchanging data to control traffic of another electronic device which interworks with an electronic device.

BACKGROUND

As electronic devices are increasingly used in recent years, interest in various additional functions provided through the electronic devices is growing. For example, users are interested in the functions of making two different electronic devices interwork with each other and thus improving user's convenience. For example, various functions of making an electronic device, which may be worn on a user's body, that is, a wearable device, interwork with an electronic device, such as a smartphone, are provided, thus improving user's convenience.

Meanwhile, power consumption efficiency of a battery and battery durability are very important factors when the user selects and uses the electronic device. The wearable device consumes much power of the battery due to continuous or periodic traffic generated by the smartphone interworking therewith. Therefore, there is a demand for a method for reducing power consumption of a battery in a wearable device which interworks with another electronic device such as a smartphone.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for controlling traffic for another electronic device interworking with an electronic device in the electronic device.

Another aspect of the present disclosure is to provide an apparatus and method for controlling traffic of another electronic device interworking with an electronic device by controlling a time to transmit data to another electronic device in the electronic device.

Another aspect of the present disclosure is to provide an apparatus and method for controlling traffic of another electronic device interworking with an electronic device by controlling the number of times data is transmitted to another electronic device in the electronic device.

Another aspect of the present disclosure is to provide an apparatus and method for determining a data transmission time based on a driving time of another electronic device interworking with an electronic device in the electronic device.

Another aspect of the present disclosure is to provide an apparatus and method for determining a data collection time and a transmission time of collected data based on a driving time of another electronic device interworking with an electronic device in the electronic device.

Another aspect of the present disclosure is to provide an apparatus and method for detecting occurrence of an event that needs to be notified to another electronic device interworking with an electronic device, and notifying another electronic device of the occurrence of the event based on whether the event is a transient event or multiple events.

Another aspect of the present disclosure is to provide an apparatus and method for preventing data transmission to another electronic device interworking with an electronic device from being delayed for more than a predetermined time.

Another aspect of the present disclosure is to provide an apparatus and method for controlling a time to synchronize with another electronic device interworking with an electronic device based on a time when data traffic is generated in another electronic device.

In accordance with an aspect of the present disclosure, a method for controlling traffic of a second electronic device which interworks with a first electronic device in the first electronic device is provided. The method includes detecting occurrence of an event which needs to be notified to the second electronic device, determining a notification time to notify the occurrence of the event based on a driving time of the second electronic device, and transmitting an event occurrence notification signal to the second electronic device at the notification time.

In accordance with another aspect of the present disclosure, an apparatus for controlling traffic of a second electronic device which interworks with a first electronic device in the first electronic device is provided. The apparatus includes a processor configured to detect occurrence of an event which needs to be notified to the second electronic device, and to determine a notification time to notify the occurrence of the event based on a driving time of the second electronic device and a communication module configured to transmit an event occurrence notification signal to the second electronic device at the notification time.

In accordance with another aspect of the present disclosure, a method for controlling traffic of a second electronic device which interworks with a first electronic device in the first electronic device is provided. The method includes detecting generation of traffic to the second electronic device before a synchronization time with the second electronic device arrives and controlling one of a processing time of the traffic and the synchronization time with the second electronic device.

In accordance with another aspect of the present disclosure, an apparatus for controlling traffic of a second electronic device which interworks with a first electronic device in the first electronic device is provided. The apparatus includes a processor configured to detect generation of traffic to the second electronic device before a synchronization time with the second electronic device, and to control one of a processing time of the traffic and the synchronization time with the second electronic device and a communication module configured to transmit one of the traffic and synchronization data to the second electronic device under control of the processor.

In accordance with another aspect of the present disclosure, a method for controlling traffic of a second electronic device which interworks with a first electronic device in the first electronic device is provided. The method includes detecting, by the first electronic device, a data change of an application which needs to be synchronized with the second electronic device, detecting generation of traffic to the second electronic device, and transmitting the changed data of the application to the second electronic device along with the traffic.

In accordance with another aspect of the present disclosure, an apparatus for controlling traffic of a second electronic device which interworks with a first electronic device in the first electronic device is provided. The apparatus includes a processor configured to detect a data change of an application which needs to be synchronized with the second electronic device, and to detect generation of traffic to the second electronic device and a communication module configured to control to transmit the changed data of the application to the second electronic device along with the traffic under control of the processor.

The electronic device according to the present disclosure controls traffic of another electronic device interworking therewith by controlling at least one of a data transmission time for another electronic device and a number of times data is transmitted based on a driving time of another electronic device, thereby reducing the driving time of another electronic device and thus reducing current power consumption. Accordingly, a battery life may be improved. In addition, the electronic device according to the present disclosure prevents data transmission to another electronic device from being delayed and performs synchronization by using feedback, so that quality of experience of the user may be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
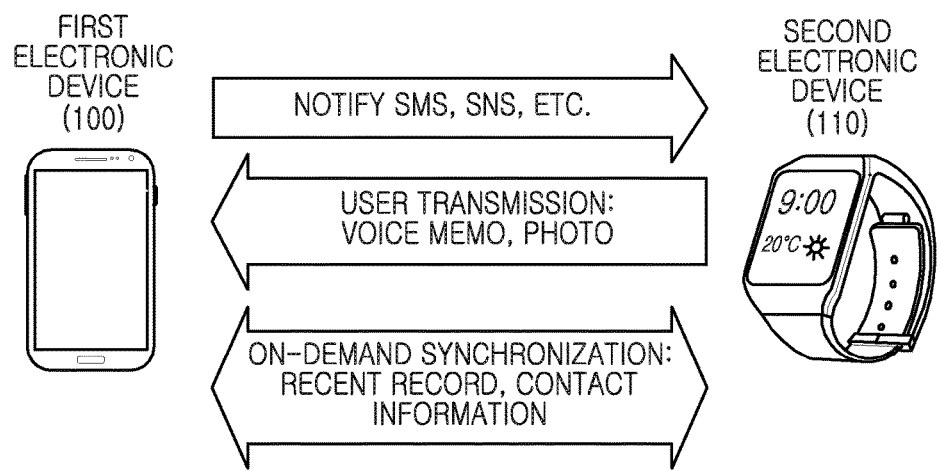
FIG. 1 illustrates a view showing data which is exchanged between a first electronic device and a second electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", and "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B" and "at least one of A or/and B" used in the various embodiments of the present disclosure include any and all combinations of words enumerated with it. For example, "A or B" or "at least one of A or/and B" means including A, including B, or including both A and B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . ." may mean that the apparatus is "capable of . . ." along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms used in various embodiments of the present disclosure are just for the purpose of describing particular various embodiments and are not intended to limit the present disclosure.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments.

The present disclosure relates to an apparatus and method for exchanging data to control traffic of a second electronic device which interworks with a first electronic device in the first electronic device. The first electronic device and the second electronic device, which will be explained below, may include at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), a Motion Picture Expert Group (MPEG) audio layer 3 (MP3) player, a mobile medical machine, a camera, a wearable device, an electronic clock, a watch, a refrigerator, an air conditioner, a cleaner, an artificial intelligence robot, a Television (TV), a Digital Video Disk (DVD) player, a stereo, an oven, a microwave oven, a washing machine, an air cleaner, a medical machine, e.g., Magnetic Resonance Angiography (MRA), Magnetic Resonance Imaging (MRI), Computerized Tomography (CT), a tomograph, and an ultrasound machine, a navigation device, a Global Positioning System (GPS) receiver, an Event Data Recorder (EDR), a Flight Data Recorder (FDR), a set-top box, a TV box, for example, Samsung HomeSync™, Apple TV™, or Goggle TV™, an electronic dictionary, an automotive infotainment device, electronic equipment for ship, for example, a navigation equipment for ship, a gyro compass, avionics, a security device, a camcorder, a game console, a part of furniture or a building/a structure including an electronic device, an electronic board, an electronic signature receiving device, and a projector Hereinafter, various embodiments of the present disclosure will be described on the assumption that a first electronic device is a mobile communication electronic device such as a smartphone, a tablet PC, and/or a mobile phone, and a second electronic device is a wearable device. However, the following description may equally be applied to the above-described electronic devices.

FIG. 1 illustrates data which is exchanged between a first electronic device and a second electronic device according to an embodiment of the present disclosure.

Referring to FIG. 1, a first electronic device 100 is connected with a second electronic device 110 via a wireless link and exchanges data with the second electronic device 100. For example, the first electronic device 100 and the second electronic device 110 may be connected with each other in a short-range wireless communication technology such as Bluetooth (BT), and may exchange data with each other according to a user's request, detection of occurrence of an event, and/or a pre-set regulation.

For example, when an event that needs to be notified to the second electronic device 110 occurs by one or more applications installed in the first electronic device 100, the first electronic device 100 may transmit a signal for notifying the occurrence of the event to the second electronic device 110. For example, when a message reception event is detected by a short message service (SMS) application, a social network service (SNS) application, and/or an e-mail service application, the first electronic device 100 may transmit a signal for notifying the message reception to the second electronic device 110.

In addition, the second electronic device 110 may transmit data stored in the second electronic device 110 to the first electronic device 100 according to a user's request. For example, the second electronic device 110 may transmit a voice memo, a photo, an S voice, a view signal in a notification device, and the like to the first electronic device 100 according to a user's request.

In addition, when data of a specific application installed in the first electronic device 100 is updated and then the specific application is executed in the second electronic device 110, the first electronic device 100 and the second electronic device 110 may exchange information on the updated data and perform synchronization. For example, when execution of a recent call record application, a contact information application, a media control application, or the like, is detected in the second electronic device 110, the first electronic device 100 and the second electronic device 110 may exchange information related to updated recent call records, updated contact information, and/or updated media data with each other.

In addition, although not shown, the first electronic device 100 and the second electronic device 110 may perform synchronization with respect to a specific application in a pre-set period without control of the user.

As described above, the first electronic device 100 and the second electronic device 110 may exchange various data with each other.

Figure 2:
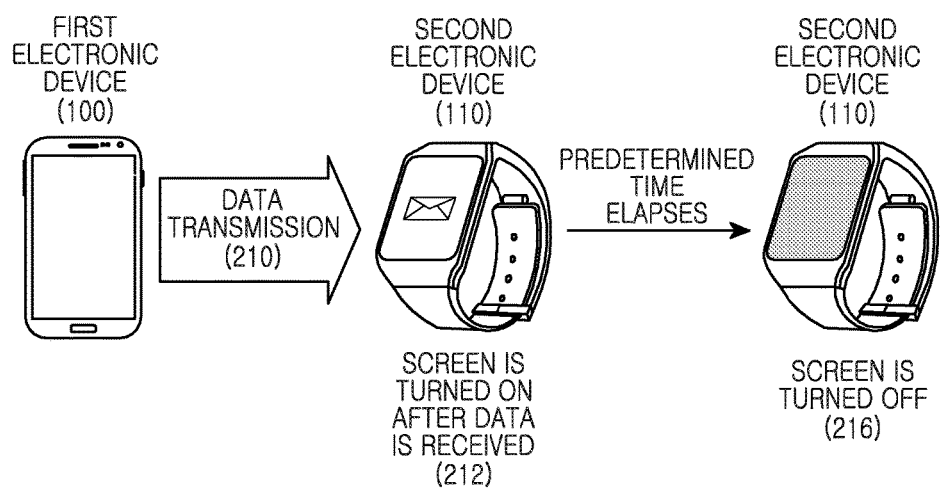
FIG. 2 illustrates a view showing an operation when a second electronic device receives data from a first electronic device according to an embodiment of the present disclosure.

FIG. 2 illustrates an operation when the second electronic device receives data from the first electronic device according to an embodiment of the present disclosure. Herein, it is assumed that there is no user input to the second electronic device 100.

Referring to FIG. 2, when the first electronic device 100 transmits data to the second electronic device 110 in operation 210, the second electronic device 110 receives the data from the first electronic device 100, changes a standby state into an activation state, and then turns on a screen in operation 212. That is, when receiving data from the first electronic device 100, the second electronic device 110 may turn on an AP and then turn on the screen, and may display information on the received data on the screen. Thereafter, when a pre-set time elapses without a user input, the second electronic device 110 turns off the screen in operation 216, turns off the AP, and changes back to the standby state. In this case, the second electronic device 110 consumes current as shown in FIG. 3.

Figure 3:
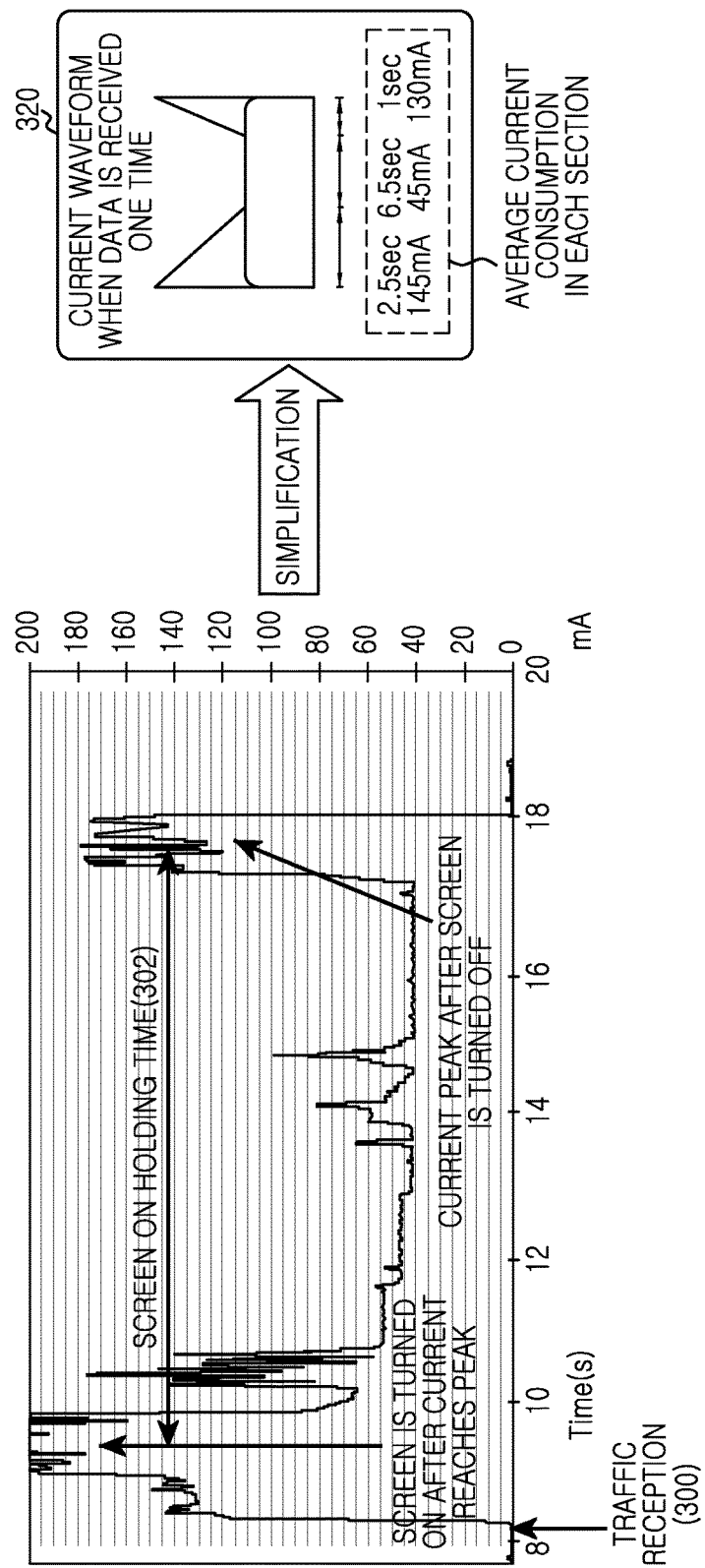
FIG. 3 illustrates a view showing current consumption accompanied by data reception in a second electronic device according to an embodiment of the present disclosure.

FIG. 3 illustrates current consumption accompanied by data reception in second electronic device according to an embodiment of the present disclosure.

Referring to FIG. 3, when traffic is received at the second electronic device 110 by data transmission from the first electronic device 100 at traffic reception 300, current consumption reaches the peak since the AP is turned on and analyzes and processes corresponding traffic data. Thereafter, when a pre-set screen on holding time 302 elapses, the current consumption of the second electronic device 110 reaches the peak again since the AP is turned off. Thereafter, the current consumption abruptly decreases. For example, the second electronic device 110 consumes little current of about 0.98 mA in the standby state, and consumes average current of about 76.66 milliamps (mA) in the activation state in which the AP is turned on by traffic generation. In particular, referring to a right view 320 of FIG. 3 briefly showing a current consumption waveform of the second electronic device 110, it can be seen that the second electronic device 110 consumes much current of about 145 mA and 130 mA on average when the AP is turned on/off.

Accordingly, various embodiments of the present disclosure propose a method for reducing total current consumption of the second electronic device 110 by minimizing a driving time of the second electronic device 110 taken by data transmission from the first electronic device 100 and reducing the number of times current consumption reaches the peak. Herein, the driving time of the second electronic device 110 may refer to a time between a time at which the AP is turned on and a time at which the AP is turned off, or may refer to a time during which the second electronic device 110 is operated in the activation state.

In various embodiments described below, the number of times the current consumption reaches the peak may be reduced by reducing the number of times data is transmitted from the first electronic device 110 to the second electronic device 110 or by minimizing the driving time of the second electronic device 110 taken by data transmission from the first electronic device 100 using a method for controlling a data transmission time.

Figure 4A:
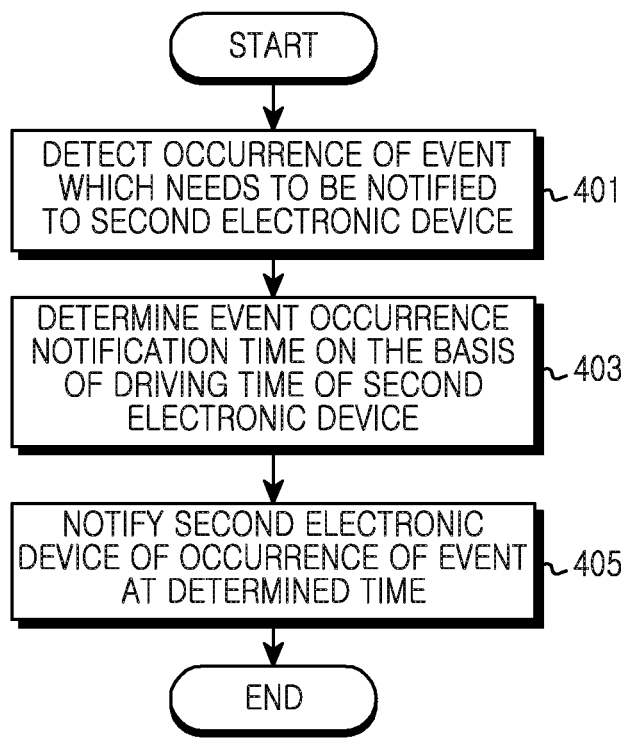
FIG. 4A illustrates a view showing an operating procedure of a first electronic device according to an embodiment of the present disclosure.

FIG. 4A illustrates an operating procedure of a first electronic device according to an embodiment of the present disclosure.

Referring to FIG. 4A, the first electronic device 100 detects occurrence of an event that needs to be notified to the second electronic device 110 in operation 401. The event that needs to be notified to the second electronic device 100 refers to an event that needs to be recognized by a user from among the events occurring by applications installed in the first electronic device 100, and may include an SMS message reception event, an SNS message reception event, an e-mail reception event, a schedule notification time satisfaction event, or the like, for example. The event that needs to be notified to the second electronic device 110 may be pre-set by a designer and/or a user of the first electronic device 100. For example, the designer and/or the user may set whether to notify the second electronic device 110 of occurrence of an event for every application of the first electronic device 100 through the screen of the first electronic device 100 or the second electronic device 110, or may set whether to notify the second electronic device 110 of occurrence of an event for all possible events in each application. In addition, when designing the first electronic device 100, the designer may set to notify the second electronic device 110 of occurrence of all events by a specific application, or may set to notify the second electronic device 110 of occurrence of a specific event by a specific application.

The first electronic device 100 determines a time to notify the occurrence of the event, which may also be referred to as a notification time, based on a driving time of the second electronic device 110 in operation 403. For example, the first electronic device 100 may determine the event occurrence notification time based on a basic driving time during which the second electronic device 110 is operated in the activation state upon receiving data one time. Information on the basic driving time of the second electronic device 110 may be received from the second electronic device 110 or may be pre-stored in the first electronic device 100. In addition, the basic driving time of the second electronic device 110 may be changed according to a screen holding time when the screen holding time is changed by the user. For example, the first electronic device 100 may determine the event occurrence notification time based on whether the basic driving time of the second electronic device 110 elapses from the time previous data was transmitted to the second electronic device 110. When the basic driving time of the second electronic device 110 does not elapse from the time the previous data was transmitted to the second electronic device 110, the first electronic device 100 may determine to promptly notify the occurrence of the event detected in operation 401, and, when the basic driving time of the second electronic device 110 elapses from the time the previous data was transmitted to the second electronic device 110, the first electronic device 110 may determine a screen off time of the first electronic device 100 as the time to notify the occurrence of the event detected in operation 401. In another example, the first electronic device 100 may determine a data collection time or an event collection time based on the basic driving time of the second electronic device 110, and may determine a time at which the data collection time elapses or expires as the event occurrence notification time.

Thereafter, the first electronic device 100 notifies the second electronic device 110 of the occurrence of the event at the determined time in operation 405. When notifying the occurrence of the event, the first electronic device 100 may transmit data related to the corresponding event along with information for notifying the occurrence of the corresponding event. For example, when an SMS message is received at the first electronic device 100, the first electronic device 100 may transmit a caller number, a receiving time, and a message text of the SMS message to the second electronic device 110 along with information for notifying that the SMS message is received.

Thereafter, the first electronic device 100 finishes the procedure according to the embodiment of the present disclosure.

Figure 4B:
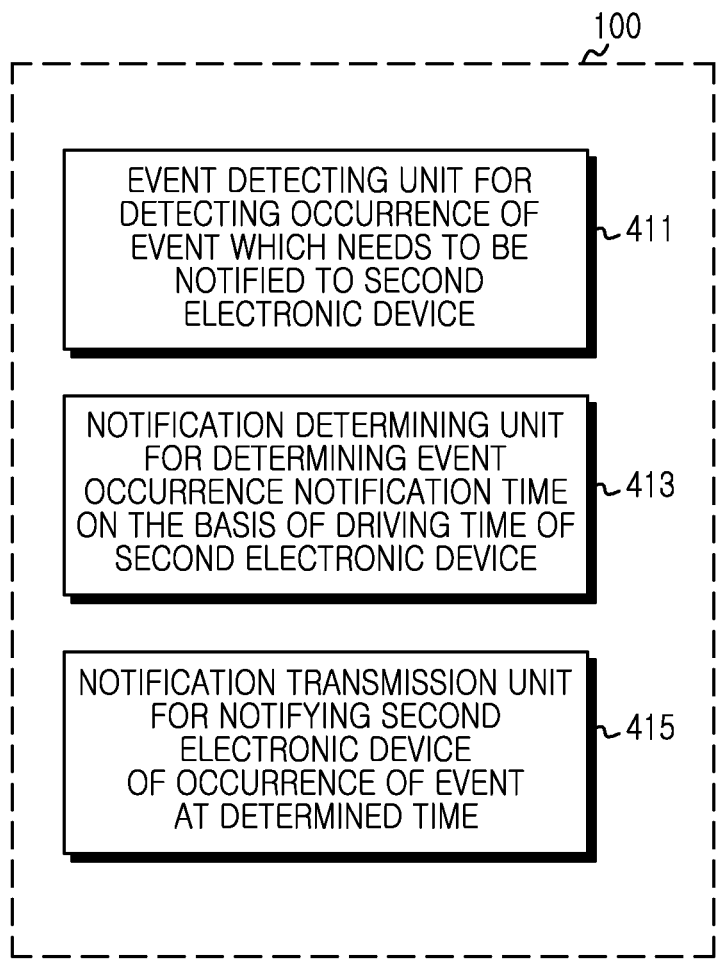
FIG. 4B illustrates a view showing a structure of a first electronic device according to an embodiment of the present disclosure.

FIG. 4B illustrates a structure of a first electronic device according to an embodiment of the present disclosure.

Referring to FIG. 4B, the first electronic device 100 includes an event detecting unit 411 for detecting occurrence of an event that needs to be notified to the second electronic device 110. The first electronic device 100 may include at least one application and/or AP that includes the event detecting unit 411 to detect occurrence of an event that needs to be notified to the second electronic device 110.

The first electronic device 100 includes a notification determining unit 413 for determining a time to notify the occurrence of the event based on a driving time of the second electronic device 110. For example, the first electronic device 100 may include an AP or a separate notification control program may include the notification determining unit 413 to determine the event occurrence notification time based on a basic driving time during which the second electronic device 110 is operated in the activation state upon receiving data one time.

In addition, the first electronic device 100 includes a notification transmission unit 415 for notifying the second electronic device 110 of the occurrence of the event at the determined time. For example, the first electronic device 100 may include a communication module that includes a notification transmission unit 415 to transmit an event occurrence notification signal to the second electronic device 110.

Hereinafter, a method for determining an event occurrence notification time based on a driving time of the second electronic device 110 in the first electronic device 100 according to various embodiments of the present disclosure will be described. In the following description, the event refers an event that needs to be recognized by the user or needs to be notified to the second electronic device 110.

Figure 5A:
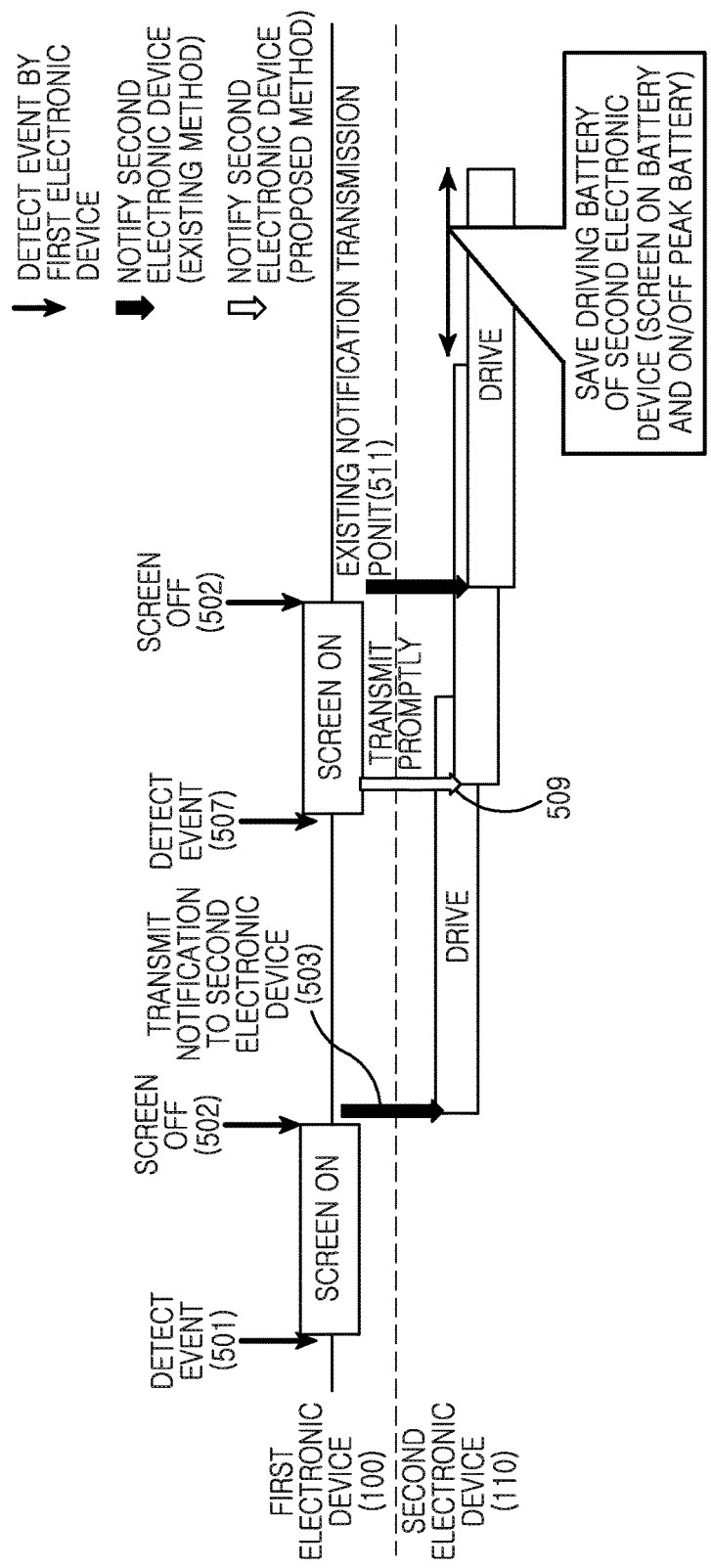
FIG. 5A illustrates a view showing a time at which a first electronic device notifies a second electronic device of occurrence of an event according to an embodiment of the present disclosure.
Figure 5B:
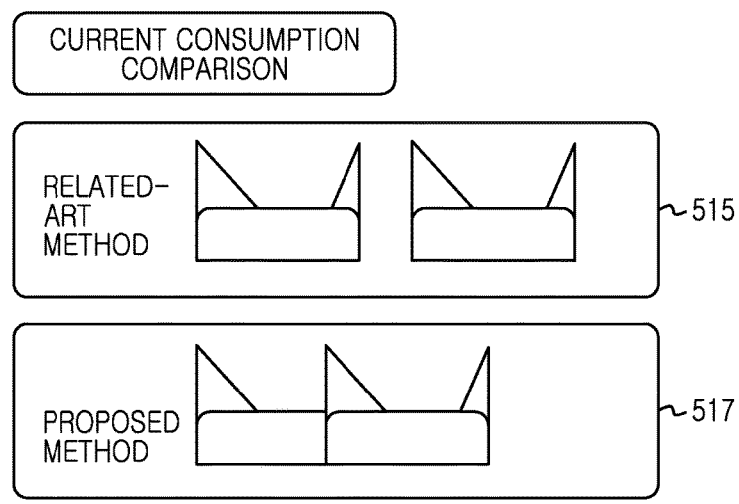
FIG. 5B illustrates a view showing current consumption of the first electronic device according to FIG. 5A according to an embodiment of the present disclosure.
Figure 5C:
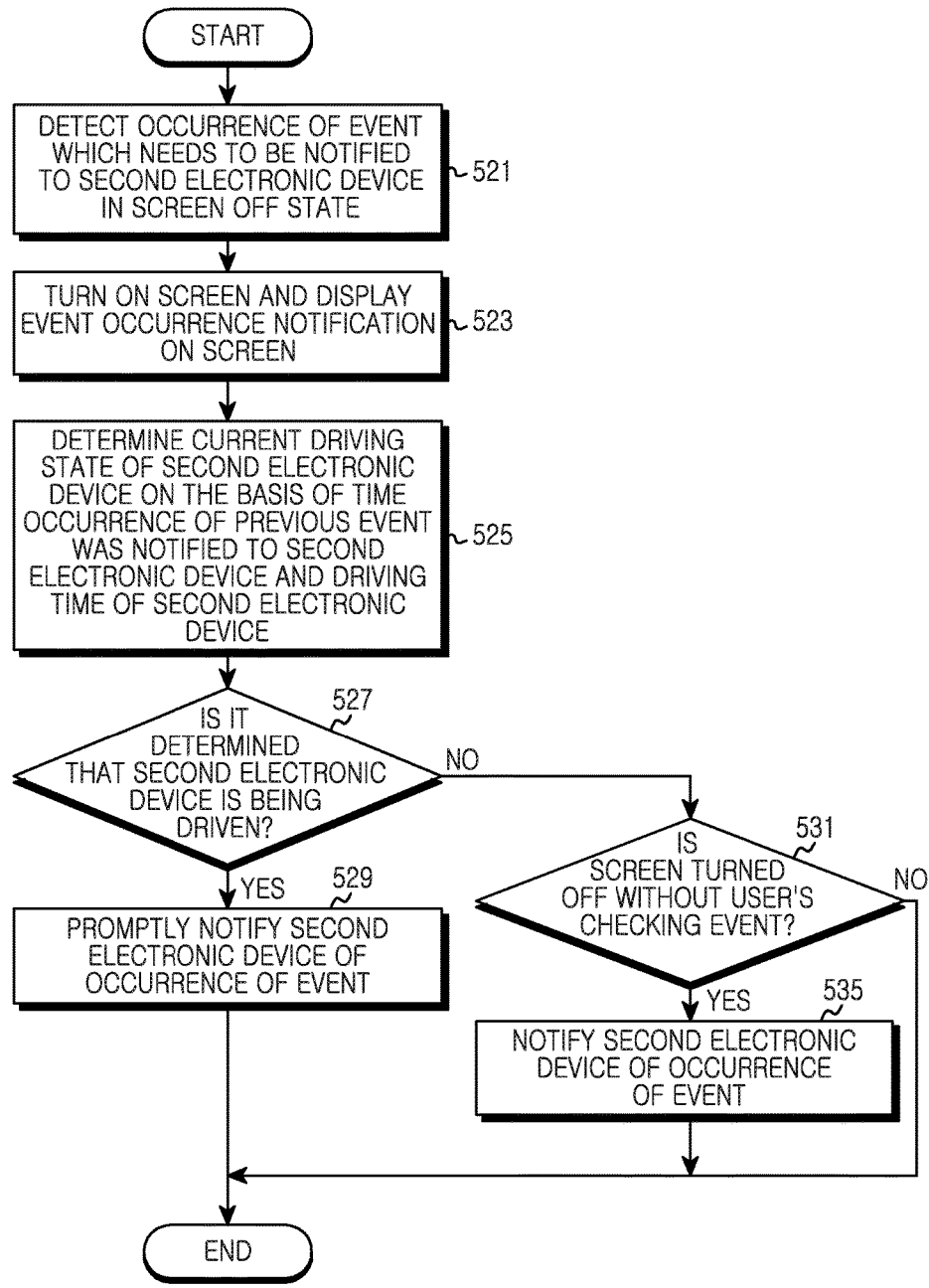
FIG. 5C illustrates a view showing a procedure for notifying a second electronic device of occurrence of an event by a first electronic device according to an embodiment of the present disclosure.

Referring to FIGS. 5A to 5C, a method for determining an event occurrence notification time based on a basic driving time of the second electronic device 110 and a previous event occurrence notification time when an event is detected by the first electronic device 100 will be explained. In the embodiments of FIGS. 5A to 5C, a transient event is detected by the first electronic device 100 in a situation where a lock screen is not used. The transient event refers to an event that is not expected to be followed by the same event, like an SMS reception event, an e-mail reception or schedule notification occurrence event. In addition, the lock screen is a screen that requests the user to input at least one of dragging, a signature, a pattern, a personal identification number (PIN), and a password to determine whether to allow user access to the electronic device.

FIG. 5A illustrates a time at which a first electronic device notifies a second electronic device of occurrence of an event according to an embodiment of the present disclosure.

Referring to FIG. 5A, it is common that, when an event is detected at operations 501 and 507, the first electronic device 100 may turn on the screen thereof and display event occurrence information on the screen, and, when the screen is turned off in operation 502 without a user's checking the event, the first electronic device 100 may notify the second electronic device 110 of the occurrence of the event in operations 503 and 511.

Meanwhile, according to an embodiment of the present disclosure, the first electronic device 100 determines whether the second electronic device 110 is being driven or not based on a basic driving time of the second electronic device 110 and a previous event occurrence notification time for the second electronic device 110. When it is determined that the second electronic device 110 is being driven, the first electronic device 100 determines an event occurrence notification time to promptly transmit an event occurrence notification, and, when it is determined that the second electronic device 110 is not being driven, the first electronic device 100 determines a screen off time of the first electronic device 100 as the event occurrence notification time.

For example, when a first event is detected in operation 501, the first electronic device 100 identifies a basic driving time of the second electronic device 110 and a previous event occurrence notification time for the second electronic device 110, and determines whether the second electronic device 110 is currently being driven or not. In this case, since the first electronic device 100 does not have the record of having notified the second electronic device 110 of occurrence of an event, the first electronic device 100 determines that the second electronic device 110 is not currently being driven and determines a screen off time of the first electronic device 100 as the event occurrence notification time. Accordingly, the first electronic device 100 turns on the screen of the first electronic device 100 at the time of detecting the event in operation 501 and displays information on the occurrence of the event on the screen, and, when the screen is turned off in operation 502 without a user's checking the event, the first electronic device 100 may notify the second electronic device 110 of the occurrence of the event in operation 503. When a user input to the corresponding event display is generated in the first electronic device 100 before the screen is turned off and it is recognized that the user checks the corresponding event, the first electronic device 100 may not notify the second electronic device 110 of the occurrence of the event even when the screen of the first electronic device 100 is turned off.

In addition, when an event is detected in operation 507, the first electronic device 100 identifies the basic driving time of the second electronic device 110 and the previous event occurrence notification time in operation 503 for the second electronic device 110, and determines whether the second electronic device 110 is currently being driven or not. In this case, when the basic driving time of the second electronic device 110 does not elapse from the previous event occurrence notification time in operation 503, the first electronic device 100 may determine that the second electronic device 110 is currently being driven and may determine the event occurrence notification time to promptly transmit an event occurrence notification. Accordingly, the first electronic device 100 may turn on the screen of the first electronic device 100 at the time of detecting the event in operation 507 and display information on the occurrence of the event, and may promptly notify the second electronic device 110 of the occurrence of the event without waiting for a screen off state in operation 509.

As described above, when the first electronic device 100 notifies the second electronic device 110 of occurrence of an event in a related-art method, the first electronic device 100 waits until the screen is turned off and notifies the occurrence of the event. Therefore, the second electronic device 110 receives information on the occurrence of the event in the standby state, changes into the activation state, and then changes back to the standby state, and, after a predetermined time, receives information on occurrence of an event, changes into the activation state, and changes back to the standby state. The second electronic device 110 repeats these operations. In this case, the second electronic device 110 consumes current in the form of the related-art method shown in box 515 of FIG. 5B.

On the other hand, according to an embodiment of the present disclosure, the first electronic device 100 determines whether the second electronic device 110 is being driven or not based on a previous event notification time and the basic driving time of the second electronic device 110, and, when it is determined that the second electronic device 110 is being driven, the first electronic device promptly notifies the occurrence of the event. Accordingly, the second electronic device 110 receives information on occurrence of an event in the standby state and changes into the activation state, and receives information on occurrence of an event again prior to changing back to the standby state. In this case, the second electronic device 110 consumes current in the form shown in box 517 of FIG. 5B. Accordingly, when the first electronic device 100 determines the event occurrence notification time based on the basic driving time of the second electronic device 110 according to the embodiment, the first electronic device 100 may achieve the effect of reducing current consumption in comparison with the related-art method.

FIG. 5C illustrates a procedure for notifying a second electronic device of occurrence of an event by a first electronic device according to an embodiment of the present disclosure.

Referring to FIG. 5C, the first electronic device 100 detects occurrence of an event that needs to or should be notified to the second electronic device in a screen off state in operation 521. For example, the first electronic device 100 may detect occurrence of an SMS reception event, an e-mail reception event or a schedule notification event in the screen off state without a lock screen being set.

The first electronic device 100 turns on the screen of the first electronic device 100 and then displays information for notifying the occurrence of the event on the screen in operation 523.

Thereafter, in operation 525, the first electronic device 100 determines a current driving state of the second electronic device 110 based on a time occurrence at which the first electronic device 100 previously notified the second electronic device 110 of occurrence of a previous event, and a driving time of the second electronic device 110. For example, it is assumed that, when the second electronic device 110 receives an event notification one time, 10 seconds are required for the AP to be turned on, process the event notification, and be turned off again. In this case, when occurrence of an event is notified to the second electronic device 110 5 seconds before with reference to a current time, the first electronic device 100 may determine that the second electronic device 110 is in a driving state in which the AP is currently turned on. On the other hand, when occurrence of an event is notified to the second electronic device 110 1 minute before with reference to a current time, the first electronic device 100 may determine that the electronic device 110 is in a non-driving state in which the AP is currently turned off.

As a result of the determining in operation 525, the first electronic device 100 determines whether the second electronic device 110 is in the driving state or non-driving state in operation 527, and, when it is determined that the second electronic device 110 is in the driving state, the first electronic device 100 promptly notifies the second electronic device 110 of the occurrence of the event in operation 529. That is, the first electronic device 100 promptly notifies the second electronic device 110 of the occurrence of the event without waiting until the screen of the first electronic device 100 is turned off. Thereafter, the first electronic device 100 finishes the procedure according to the embodiment of the present disclosure.

On the other hand, when it is determined that the second electronic device 110 is in the non-driving state, the first electronic device determines whether the screen is turned off without a user's checking of the event in operation 531. When the screen is turned off without the user's checking of the event, the first electronic device 100 notifies the second electronic device of the occurrence of the event in operation 535. For example, after the screen of the first electronic device 100 is turned on and displays information on occurrence of an event, when the screen is automatically turned off without a user's input during a predetermined time, the first electronic device 100 may determine that the user does not check the event and may notify the second electronic device 110 of the occurrence of the event.

After the screen of the first electronic device 100 is turned on and the information on the occurrence of the event is displayed in the first electronic device 100, when a user input to the display of the corresponding event is generated before the screen is turned off in operation 531, the first electronic device 100 determines that the user checks the corresponding event and does not notify the second electronic device 110 of the occurrence of the event even when the screen is turned off, and finishes the procedure according to the embodiment of the present disclosure.

Next, a method for determining an event occurrence notification time based on a basic driving time of the second electronic device 110 when an event is detected by the first electronic device 100, and transmitting events detected until the event occurrence notification time collectively will be explained with reference to FIGS. 6A to 6C. In other words, the first electronic device 100 may determine an event collection time based on the basic driving time of the second electronic device 110 and may transmit the events collected until the event collection time collectively at the time the event collection time expires. In addition, a case in which a multiple event is detected in the first electronic device 100 will be explained by way of an example. The multiple event is an event which is expected to be followed by the same event, that is, an event that is expected to be followed by the same event within a predetermined time, like an SNS message reception event. According to an embodiment, the first electronic device may determine whether an event is a transient event or a multiple event based on the number of events occurring by a corresponding application during a threshold time after the application is installed in the first electronic device 100. In addition, a designer and/or a user of the first electronic device 100 may distinguish or set whether each event is a transient event or a multiple event.

Figure 6A:
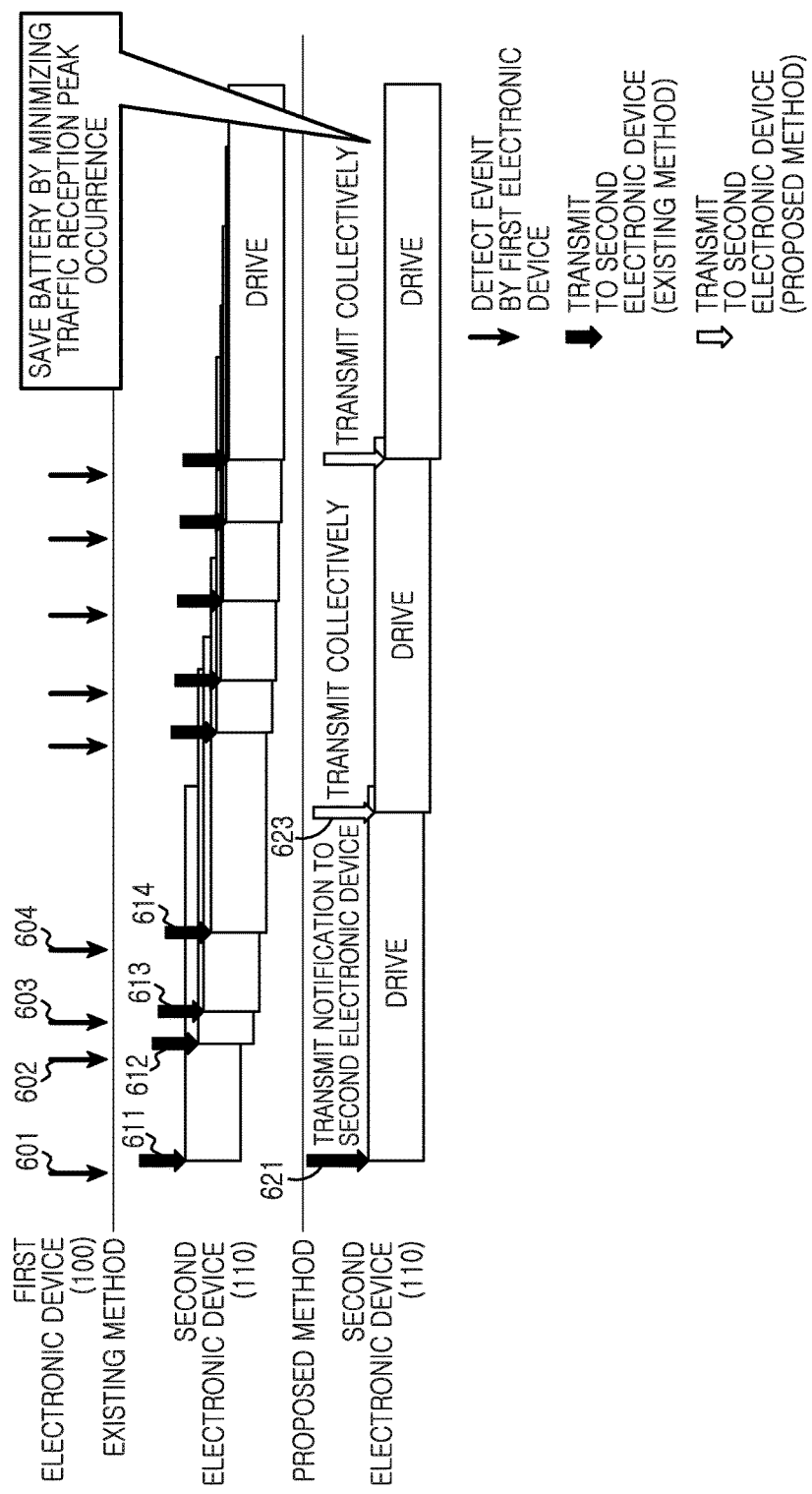
FIG. 6A illustrates a view showing a time at which a first electronic device notifies a second electronic device of occurrence of an event according to another embodiment of the present disclosure.
Figure 6B:
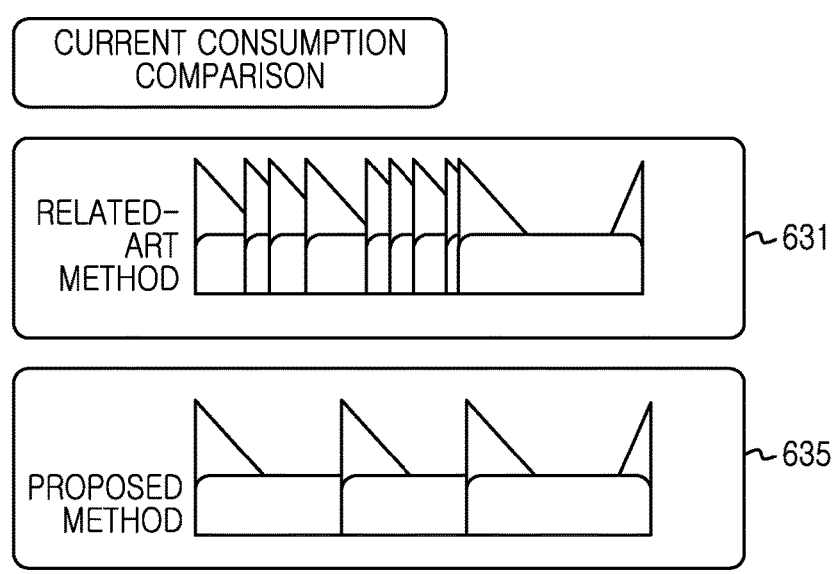
FIG. 6B illustrates a view showing current consumption of the first electronic device according to FIG. 6A according to an embodiment of the present disclosure.

FIG. 6A illustrates a time at which a first electronic device notifies a second electronic device of occurrence of an event according to another embodiment of the present disclosure.

Referring to FIG. 6A, it is common that, when the first electronic device 100 detects at least one of events 601, 602, 603, and 604, the first electronic device 100 turns on the screen of the first electronic device 100 and displays information on the occurrence of the event on the screen, and simultaneously, notifies the second electronic device 110 of the occurrence of the event at event notification times 11, 612, 613, and 614.

However, according to an embodiment of the present disclosure, the first electronic device 100 determines an event collection time based on a basic driving time of the second electronic device 110 and determines whether events continuously occur or not during the event collection time, and transmits the events 601, 602, 603, and 604 detected during the event collection time collectively when the event collection time expires at expiration time 623. In this case, the first electronic device 100 may promptly notify the second electronic device 110 of the occurrence of the first multiple event according to a design method at notification time 621.

In particular, according to an embodiment of the present disclosure, the first electronic device 100 may determine the event collection time as shown in Equation 1:

$$T1 = \text{(Driving Time of Second Electronic Device)} - \text{(Time of Communication between First Electronic Device and Second Electronic Device)} - \text{margin} \quad \text{Equation 1}$$

Herein, T1 is an event collection time, a driving time of the second electronic device is a basic driving time during which the second electronic device 110 is driven when receiving an event notification or data one time, and a time of communication between the first electronic device and the second electronic device is a time that is taken for a signal transmitted from the first electronic device 100 to be received at the second electronic device 110. In addition, "margin" is a value for allowing an event notification of the first electronic device 100 to stably arrive at the second electronic device 110 before the driving of the second electronic device is stopped, regardless of a channel state between the first electronic device 100 and the second electronic device. The "margin" may be pre-set or changed by learning Additionally, the first electronic device 100 may collect events detected in the first electronic device 100 from the time the event is detected to the time the event collection time elapses, and may transmit the collected events to the second electronic device 110 collectively, regardless of whether a lock screen is used or not in the first electronic device 100 and regardless of a screen off time of the first electronic device 100.

Additionally, when an input to a corresponding event is generated by the user while the first electronic device 100 continuously collects the events occurring during the event collection time without notifying the second electronic device 110 of the occurrence of events, and it is recognized that the user checks the corresponding events, the first electronic device 100 stops collecting the events and does not notify the second electronic device 110 of the occurrence of the events.

As described above, when the first electronic device 100 notifies the second electronic device 110 of occurrence of an event in a related-art method, the first electronic device 100 notifies the second electronic device 110 of the occurrence of the event every time the occurrence of the event is detected. In this case, the second electronic device 110 consumes current in the form of the related-art method shown in box 631 of FIG. 6B.

On the other hand, according to an embodiment of the present disclosure, the first electronic device 100 collects events during the event collection time which is determined based on the basic driving time of the second electronic device 110, without notifying occurrence of the events, and notifies the second electronic device 110 of the collected event collectively when the event collection time expires. In this case, the second electronic device 110 consumes current in the form shown in box 635 of FIG. 6B. Accordingly, according to the embodiment of the present disclosure, when the first electronic device 100 collects events during a predetermined time based on the basic driving time of the second electronic device 100 and transmits the events collectively, the first electronic device 100 may achieve the effect of reducing current consumption in comparison with the related-art method.

Figure 6C:
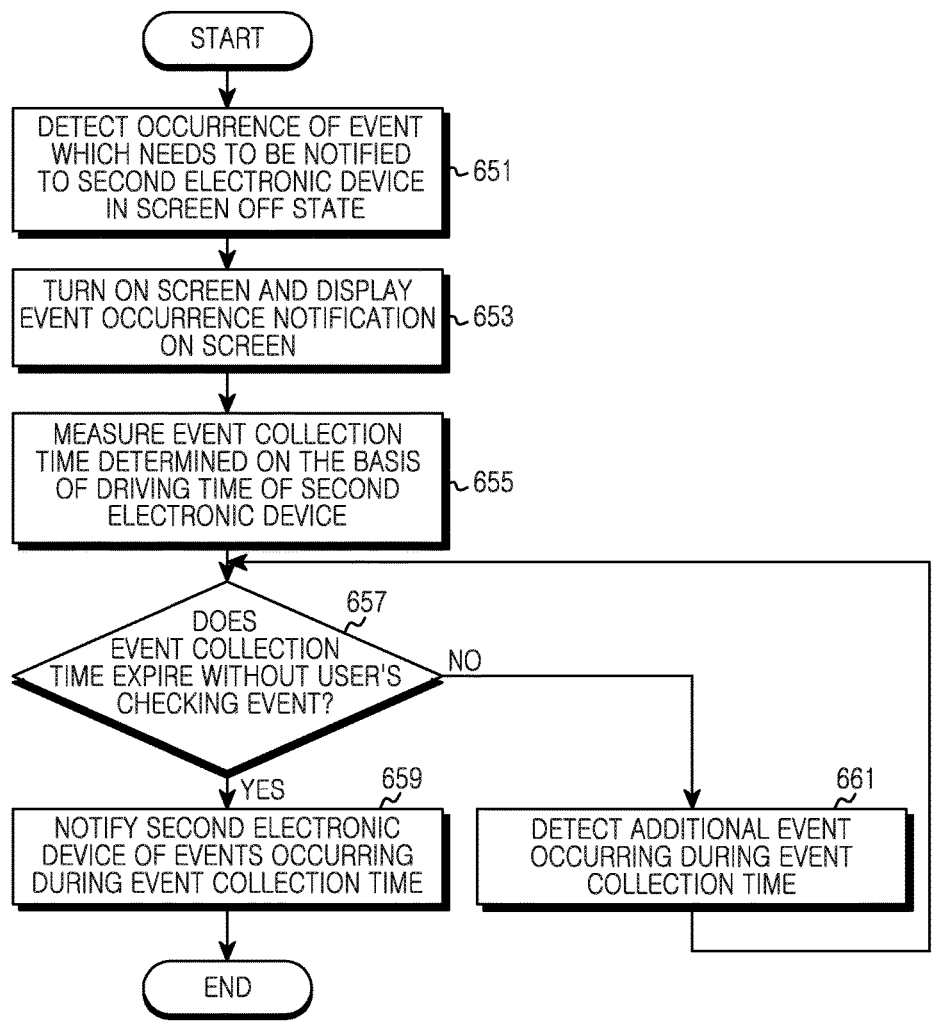
FIG. 6C illustrates a view showing a procedure for notifying a second electronic device of occurrence of an event by a first electronic device according to another embodiment of the present disclosure.

FIG. 6C illustrates a procedure for notifying a second electronic device of occurrence of an event by a first electronic device according to another embodiment of the present disclosure.

Referring to FIG. 6C, the first electronic device 100 detects occurrence of an event that needs to be notified to the second electronic device in a screen off state in operation 651. For example, the first electronic device 100 may detect occurrence of an SNS message reception event which is set as a multiple event in the screen off state without a lock screen being set.

The first electronic device 100 turns on the screen of the first electronic device 100 and then display information for notifying the occurrence of the event on the screen in operation 653.

Thereafter, the first electronic device 100 determines an event collection time based on a driving time of the second electronic device 110, and measures the determined event collection time in operation 655. Although not shown, the first electronic device 100 may notify the second electronic device 110 of the occurrence of the event detected in operation 651.

Thereafter, the first electronic device 100 determines whether the event collection time expires or not without a user's checking the event in operation 657. For example, the first electronic device 100 may continue detecting the multiple events occurring in the first electronic device 100 during the event collection time and may determine whether the event collection time expires or not in a state in which a user input to the detected multiple event is not generated.

When the event collection time expires without the user's checking, the first electronic device notifies the second electronic device 110 of the events occurring during the event collection time in operation 659.

On the other hand, when the event collection time does not expire without the user's checking, that is, when the event collection time does not expire, the first electronic device 100 proceeds to operation 661 to detect an additional event occurring during the event collection time and resumes operation 657 to re-perform the subsequent operations. Although not shown, when an input is generated by the user during the event collection time and it is recognized that the user checks the events, the first electronic device stops collecting the events and does not notify the second electronic device 110 of the occurrence of the events.

In the above-described example, while the first electronic device 100 collects the events during the event collection time, the second electronic device 110 may display a notification that was received from the first electronic device 100 at the starting point of the event collection time, that is, the most recently received notification, or may provide a user interface showing that the second electronic device 110 is in progress of receiving or loading a next notification. In addition, the second electronic device 110 may provide a setting screen for the screen display during the event collection time of the first electronic device 100, so that the user may set whether to display the most recently received notification or display that the second electronic device 110 is in progress of receiving a next notification.

Additionally, according to an embodiment of the present disclosure, when an event notification display remains on the screen for more than a predetermined time, the first electronic device 100 may notify the second electronic device 110 of occurrence of the event even when the screen of the first electronic device 100 is in the on-state. That is, when occurrence of a transient event is detected while the lock screen is unused, the first electronic device 100 may turn on the screen and displays a display indicating occurrence of the event on the screen, and, when the screen is turned off without a user's checking the event occurrence notification, the first electronic device 100 notifies the second electronic device 110 of the occurrence of the event. However, when occurrence of another transient event is repeatedly detected before the screen of the first electronic device 100 is turned off, the first electronic device 100 maintains the screen on state continuously and thus delays notifying the occurrence of the transient events. According to an embodiment, to prevent the delay in notifying the occurrence of the transient events, the first electronic device 100 may notify the second electronic device 110 of the occurrence of the event remaining on the screen when the event notification display remains for more than a predetermined time, even when the screen of the first electronic device 100 is maintained in the on-state. For example, when the event occurrence notification display is maintained on an upper bar, which may be called a 'Ticker', of the screen for more than a pre-set threshold time, the first electronic device 100 may notify the second electronic device 110 of the occurrence of the corresponding event. However, when the screen is maintained in the on state by a user's input or the screen is maintained in the on state by a specific application driven by a user request, the first electronic device 100 may not notify the second electronic device 110 of occurrence of the corresponding event even if the event occurrence notification display is maintained on the upper bar of the screen for more than a threshold time.

Additionally, according to an embodiment, when occurrence of an event is detected in a state in which a lock screen is used, the first electronic device 100 determines whether a specific application is being driven or not through the lock screen according to a user request. When a specific application is being driven, the first electronic device 100 may display a notification of the detected event occurrence only on the screen of the first electronic device 100 and may not notify the second electronic device 110 of the occurrence of the event. In this case, after the driving of the specific application is stopped, when the first electronic device 100 turns off the screen or a predetermined time elapses without a user's checking the event occurrence notification, the first electronic device 100 may notify the second electronic device 110 of the occurrence of the event.

Figure 7:
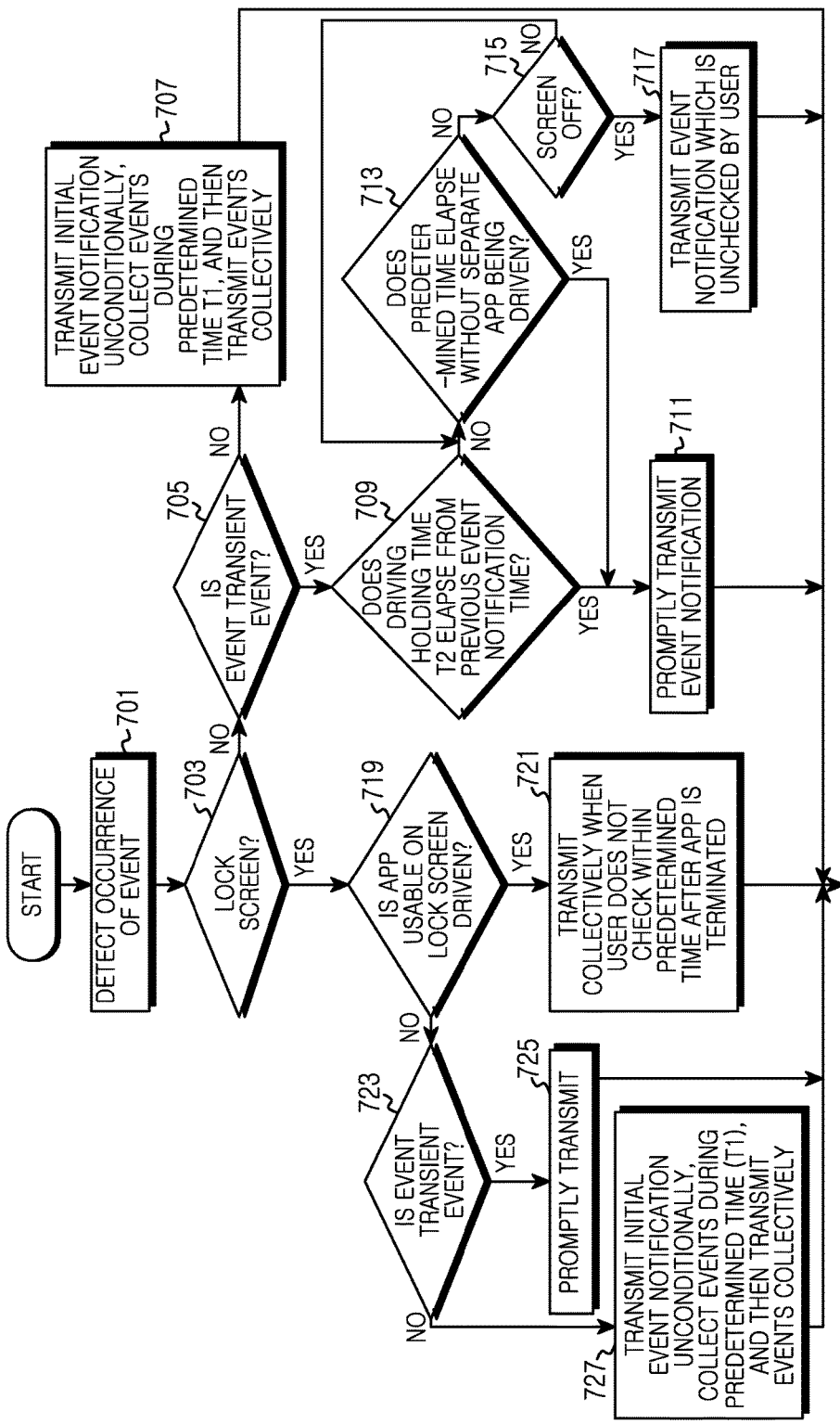
FIG. 7 illustrates a view showing a procedure for notifying a second electronic device of occurrence of an event by a first electronic device according to another embodiment of the present disclosure.

FIG. 7 illustrates a procedure for notifying a second electronic device of occurrence of an event by a first electronic device according to another embodiment of the present disclosure.

Referring to FIG. 7, the first electronic device 100 detects occurrence of an event that needs to be notified to the second electronic device 110 in operation 701. For example, the first electronic device 100 detects occurrence of an event that needs to be recognized by the user from among the events occurring by an application, which may be referred to as an "app", installed in the first electronic device 100. In this case, the first electronic device 100 may display an event occurrence notification on the screen.

The first electronic device 100 determines whether a lock screen is used or not in operation 703. The lock screen recited herein refers to a screen that requests the user to input at least one of dragging, a signature, a pattern, a PIN, and a password to determine whether to allow user access to the first electronic device 100, and the user may set whether to use the lock screen or not.

When the lock screen is not used, the first electronic device 100 determines whether the detected event is a transient event or not in operation 705. For example, the first electronic device 100 determines whether the detected event is a transient event that is not expected to be followed by the same event, like an SMS reception event, an e-mail reception event, or a schedule notification occurrence event, or the detected event is a multiple event that is expected to be followed by the same event like an SNS message reception event.

When the detected event is not a transient event, but is a multiple event, the first electronic device 100 transmits a notification on the initially detected event to the second electronic device 110 unconditionally, and then detects and collects events occurring in the first electronic device 100 during an event collection time T1, and, when the event collection time expires, transmits notifications on the collected events to the second electronic device 110 collectively in operation 707. The first electronic device may repeat operation 707 until a user input to the event occurrence notification display is detected in the first electronic device 100 or until an event is not detected for more than a threshold time. When a user input to the event occurrence notification display is detected in the first electronic device 100 or an event is not detected during more than the threshold time, the first electronic device 100 finishes the procedure according to the embodiment.

When the detected event is the transient event, the first electronic device 100 determines whether a driving holding time T2 elapses from the time a previous notification was transmitted to the second electronic device 110 in operation 709. The driving holding time T2 may be a driving time of the second electronic device 110 or may be a time which is calculated by subtracting a time of communication between the first electronic device and the second electronic device from the basic driving time of the second electronic device 110. In addition, the driving holding time T2 may have the same value as the event collection time T1.

When the driving holding time T2 does not elapse from the time the previous notification was transmitted to the second electronic device 110, the first electronic device 100 determines that the second electronic device is being driven and promptly transmits a notification on the detected event to the second electronic device 110 in operation 711. Thereafter, the first electronic device 100 finishes the procedure according to the embodiment of the present disclosure.

On the other hand, when the driving holding time T2 elapses from the time the previous notification was transmitted to the second electronic device 110, the first electronic device 100 determines that the second electronic device 110 is not being driven and determines whether a predetermined time elapses without a separate application being driven in operation 713. For example, after displaying the event occurrence notification on the screen, the first electronic device 100 determines whether a screen holding time elapses without an additional application being driven.

When the predetermined time elapses without the separate application being driven, the first electronic device 100 proceeds to operation 711 to turn off the screen and transmit the notification on the detected event to the second electronic device 110. On the other hand, when the separate application is driven before the predetermined time elapses or if the predetermined time elapses, the first electronic device 100 proceeds to operation 715 to determine whether the screen is turned off or not. For example, the first electronic device 100 determines whether the screen is turned off after an application is driven by the user and the driving of the application is stopped before a predetermined time at which the screen is automatically turned off expires or may determine whether the screen is turned off by a user input which is generated before the predetermined time at which the screen is automatically turned off expires. When the screen is not turned off, the first electronic device 100 resumes operation 713 to re-perform the subsequent operations.

On the other hand, when the screen is turned off, the first electronic device 100 transmits the notification on the event which is unchecked by the user to the second electronic device 110. Thereafter, the first electronic device 100 finishes the procedure according to the embodiment of the present disclosure.

Meanwhile, when the lock screen is determined to active and/or as being used, as a result of the determining in operation 703, the first electronic device 100 determines whether an application usable in the lock screen state is being driven or not in operation 719. When an application usable in the lock screen state is being driven, and the user does not check the event occurrence notification within a predetermined time after the driving of the application is terminated, the first electronic device 100 transmits notifications on the events that have occurred until the predetermined time to the second electronic device 110 collectively in operation 721.

On the other hand, when it is determined that the application usable in the lock screen state is not being driven in operation 719, the first electronic device 100 determines whether the detected event is a transient event or not in operation 723. When the detected event is the transient event, the first electronic device 100 promptly transmits the notification on the transient event to the second electronic device 110 in operation 725.

On the other hand, when the detected event is not a transient event, but is a multiple event, then in operation 727, the first electronic device 100 transmits a notification on the initially detected event to the second electronic device 110, detects and collect events occurring in the first electronic device 100 during the event collection time T1, and transmits notifications on the collected events to the second electronic device 110 collectively when the event collection time expires. The first electronic device 100 may repeat operation 727 until a user input to the event occurrence notification display is detected in the first electronic device 100 or until an event is not detected for more than a threshold time. When a user input to the event occurrence notification display is detected in the first electronic device or when an event is not detected for more than the threshold time, the first electronic device 100 finishes the procedure according to the embodiment of the present disclosure.

Additionally, the first electronic device 100 according to an embodiment of the present disclosure may minimize traffic for the second electronic device 110 by controlling a periodic synchronization time with the second electronic device 110.

Figure 8:
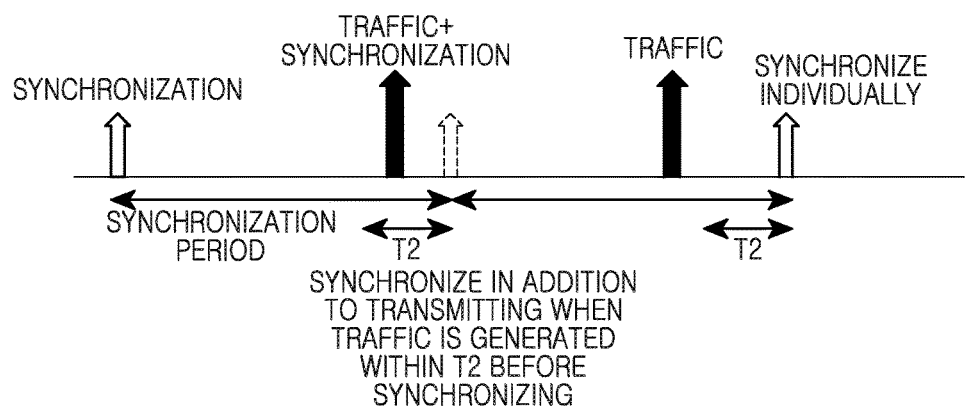
FIG. 8 illustrates a view showing a time to synchronize with a second electronic device in a first electronic device according to an embodiment of the present disclosure.

FIG. 8 illustrates a time to synchronize with a second electronic device in a first electronic device according to an embodiment of the present disclosure.

Referring to FIG. 8, the first electronic device 100 may transmit data that is set as a synchronization target from among data stored in the first electronic device 100 to the second electronic device 110 in a pre-set synchronization period, and may perform synchronization. According to an embodiment, the first electronic device 100 may not perform synchronization in a synchronization period and may perform synchronization when traffic to the second electronic device 110 is detected before a synchronization time set according to the synchronization period, so that current consumption in the second electronic device 110 caused by the traffic may be minimized. More specifically, when traffic to the second electronic device 110 is generated within a pre-set time before the synchronization time, the first electronic device 100 may transmit synchronization data by making the synchronization data piggyback on the corresponding traffic. In this case, the pre-set time may be set considering a driving time of the second electronic device 110. On the other hand, when traffic to the second electronic device 110 is not generated within the pre-set time before the synchronization time, the first electronic device 100 may wait until the synchronization time according to the synchronization period and may perform synchronization at the synchronization time.

In the embodiment of FIG. 8 described above, when generation of traffic to the second electronic device 110 is detected before the synchronization time according to the synchronization period, the synchronization is performed at the time the generation of the traffic is detected in order to minimize current consumption caused by the traffic. However, according to various embodiments of the present disclosure, when traffic is generated between synchronization times, processing of the traffic may be delayed and the traffic may be processed at the synchronization time. For example, the first electronic device 100 may perform synchronization with the second electronic device 110 at a first synchronization time, and then, when specific traffic to the second electronic device 110 is generated before a second synchronization time, may not promptly process the traffic and delay processing the traffic until the second synchronization time. When the second synchronization time arrives, the first electronic device 100 may transmit the specific traffic while performing synchronization with the second electronic device 110.

Figure 9:
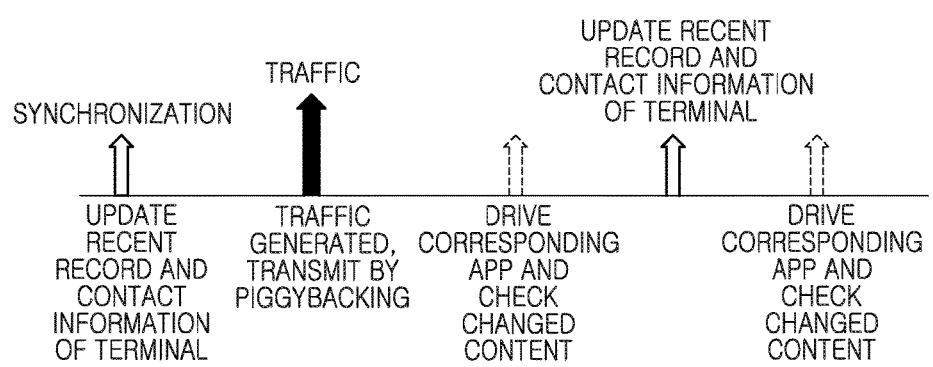
FIG. 9 illustrates a view showing a time to on-demand synchronize with a second electronic device in a first electronic device according to another embodiment of the present disclosure.

FIG. 9 illustrates an on-demand synchronization time with a second electronic device in a first electronic device according to another embodiment of the present disclosure.

Referring to FIG. 9, after data of a specific application installed in the first electronic device 100 is updated, when the specific application is executed in the second electronic device 110, the first electronic device 100 and the second electronic device 110 determine whether updated data exists or not and perform synchronization by exchanging information on the updated data with each other. For example, when a recent record and contact information are updated in the first electronic device 100 and execution of a recent record application and/or a contact information application is detected in the second electronic device 110, the first electronic device 100 and the second electronic device 110 may exchange the updated recent record and the updated contact information with each other. In this case, since the first electronic device 100 and the second electronic device 110 perform synchronization with respect to the corresponding application after execution of the application is detected in the second electronic device 110, the user recognizes that synchronization is not performed with respect to the corresponding application for a predetermined time after the application is executed. Therefore, according to an embodiment of the present disclosure, when data of a specific application installed in the first electronic device 100 is updated and traffic to the second electronic device 110 is generated in the first electronic device 100, the first electronic device 100 may transmit the updated data of the application by making the updated data piggyback on the corresponding traffic even in a state where the specific application is not executed. In this case, the second electronic device 110 receives the updated data of the application and performs synchronization in advance before the specific application is executed, so that quality of experience of the user may be improved.

Figure 10:
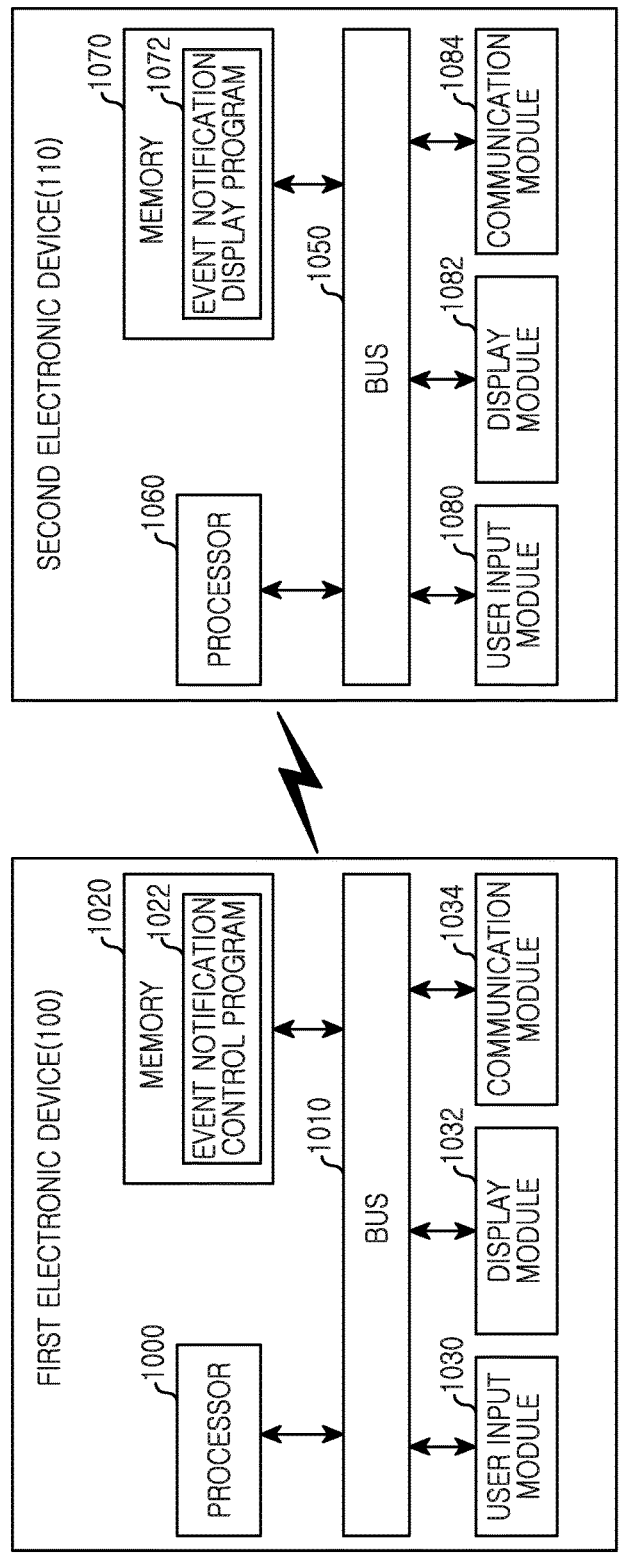
FIG. 10 illustrates a block diagram of a first electronic device and a second electronic device according to an embodiment of the present disclosure.

FIG. 10 illustrates a block diagram of a first electronic device and a second electronic device according to an embodiment of the present disclosure.

Referring to FIG. 10, the first electronic device 100 may include a processor 1000, a bus 1010, a memory 1020, a user input module 1030, a display module 1032, and a communication module 1034.

The processor 1000 may control various functions related to an operation of the first electronic device 100. For example, the processor 1000 may decipher instructions which are received from at least one other elements included in the first electronic device 100 through the bus 1010, and may perform calculation and data processing according to the deciphered instructions. In addition, the processor 1000 may control a function for providing various services by executing one or more programs stored in the memory 1020. For example, the processor 1000 may control a function for transmitting an event occurrence notification signal to the second electronic device 110 which interworks with the first electronic device 100 by executing an event notification control program 1022 stored in the memory 1020.

The bus 1010 connects the elements included in the first electronic device 100 with one another and transmits communications between the elements.

The memory 1020 may store instructions or data which is received from or generated by at least one element included in the first electronic device 100. For example, the memory 1020 may store at least one application program and may store information on events which need to be notified to the second electronic device 110. In addition, the memory 1020 may store information on a driving time of the second electronic device 110.

The memory 1020 may include programming modules such as a kernel, middleware, an application programming interface (API), an application, and the like. Each of the above-described programming modules may be configured by at least one of software, firmware, and hardware.

The event notification control program 1022 included in the memory 1020 may include instructions for detecting that an event which needs to be notified to the second electronic device 110 occurs in the first electronic device 100, and displaying a notification on the occurrence of the event on a display module 1032 or outputting the notification through a speaker (not shown). In addition, the event notification control program 1022 may include instructions for determining whether a user checks the notification on the detected event based on a user input module 1030, and transmitting the notification of the event that is unchecked, or in other words, that is not checked, by the user to the second electronic device 110. In this case, the event notification control program 1022 may include instructions for controlling an event notification transmission time and/or the number of times the event notification is transmitted based on the driving time of the second electronic device 110. For example, the event notification control program 1022 may transmit the event notification to the second electronic device 110 in the method described above with reference to FIGS. 4 to 7.

Additionally, the memory 1020 may include a program (not shown) to control a synchronization time with the second electronic device 110. For example, the memory 1020 may transmit synchronization data to the second electronic device 110 by piggybacking at the time traffic is generated, as described above in FIGS. 8 and 9.

The user input module 1030 may transmit instructions or data which is generated by user's selection or gesture to the processor 1000 or the memory 1020 via the bus 1010. The user input module 1030 may include at least one of a physical key button, a physical keypad, a touch sensor, a proximity sensor, an acceleration sensor, a microphone, and a mouse. The user input module 1030 may receive an input indicating that a notification on an event occurring in the first electronic device 100 is checked from the user.

The display module 1032 may display an image, a video, or data for the user. According to an embodiment, the display module 1032 may display an event occurrence notification display on a screen, e.g., a lock screen, a main screen, an idle screen, or an application driving screen. The event occurrence notification display may be a graphic element which is pre-mapped onto a corresponding event. The display module 1032 may turn on the screen under control of the processor 1000 and display graphic elements, or may turn off the screen and may not display graphic elements.

The communication module 1034 may perform wired or wireless communication connection between the first electronic device 100 and a base station or the first electronic device 100 and at least one other electronic device. For example, the communication module 1034 may support a short-range communication protocol, e.g., wireless fidelity (WiFi), BT, near field communication (NFC)), or network communication, e.g., Internet, a local area network (LAN), a wide area network (WAN), a telecommunication network, a cellular network, a satellite network, or a plain old telephone service (POTS)). For example, the communication module 1034 may process to transmit an event notification signal or data traffic such as synchronization data to the second electronic device 110 interworking with the first electronic device 100 under control of the processor 1000.

The second electronic device 110 may include a bus 1050, a processor 1060, a memory 1070, a user input module 1080, a display module 1082, and a communication module 1084.

The bus 1050 connects the elements included in the second electronic device 110 with one another and transmits communications between the elements.

The processor 1060 may control various functions related to an operation of the second electronic device 110. For example, the processor 1060 may decipher instructions which are received from at least one other element included in the second electronic device 110 through the bus 1050, and may perform calculation and data processing according to the deciphered instructions. In addition, the processor 1060 may control a function for providing various services by executing one or more programs stored in the memory 1070. For example, the processor 1060 may control a function for analyzing an event occurrence notification signal received from the first electronic device 100 interworking with the second electronic device 110 and displaying an event occurrence notification on the screen by executing an event notification display program 1072 stored in the memory 1070.

The memory 1070 may store instructions or data which is received from or generated by at least one element included in the second electronic device 110. For example, the memory 1070 may store at least one application program and may store information on a basic driving time of the second electronic device 110.

The memory 1070 may include programming modules such as a kernel, middleware, an API, an application, and the like. Each of the above-described programming modules may be configured by at least one of software, firmware, and hardware.

The event notification display program 1072 included in the memory 1070 may include instructions for receiving an event occurrence notification signal from the first electronic device 100 and displaying the same on the screen. In particular, the event notification display program 1072 may include instructions for recognizing an event collection time of the first electronic device 100 when a multiple event occurrence notification signal is received, and displaying a most recently received notification or displaying a user interface indicating that a next notification is being received or loaded. In this case, the event notification display program 1072 may display a setting screen on a screen display of the second electronic device 110 during the event collection time of the first electronic device 100, so that the user may set whether to display a most recently received notification or display a receiving state of a next notification.

The user input module 1080 may transmit instructions or data which is generated by user's selection or gesture to the processor 1060 or the memory 1070 via the bus 1050. The user input module 1080 may include at least one of a physical key button, a physical keypad, a touch sensor, a proximity sensor, an acceleration sensor, and a microphone.

The display module 1082 may display an image, a video, or data for the user. According to an embodiment of the present disclosure, the display module 1082 may display an event occurrence notification display on the screen. The event occurrence notification display may be a graphic element which is pre-mapped onto a corresponding event. The display module 1082 may turn on the screen under control of the processor 1060 and display graphic elements, or may turn off the screen and may not display graphic elements.

The communication module 1084 may perform wire or wireless communication connection between the second electronic device 110 and at least one other electronic device. For example, the communication module 1084 may support a short-range communication protocol, e.g., WiFi, BT, NFC, or network communication, e.g., Internet, a LAN, a WAN, a telecommunication network, a cellular network, a satellite network, or a POTS. For example, the communication module 1084 may process to receive an event notification signal or data traffic such as synchronization data from the first electronic device 100 interworking with the second electronic device 110 under control of the processor 1060.

Methods based on the embodiments disclosed in the claims and/or specification of the present disclosure may be implemented in hardware, software, or a combination of both.

When implemented in software, a computer readable recording medium for storing one or more programs (i.e., software modules) may be provided. The one or more programs stored in the computer readable recording medium are configured for execution performed by one or more processors in an electronic device. The one or more programs include instructions for allowing the electronic device to execute the methods based on the embodiments disclosed in the claims and/or specification of the present disclosure.

The computer-readable recording medium may include program commands, data files, and data structures either alone or in combination. The program commands may be those that are especially designed and configured for the present disclosure, or may be those that are publicly known and available to those skilled in the art. Examples of the computer-readable recording medium include magnetic recording media such as hard disks, floppy disks and magnetic tapes, optical recording media such as compact diskread only memory (CD-ROMs) and DVDs, magneto-optical recording media such as floptical disks, and hardware devices such as read-only memory (ROMs), random access memory (RAMs) and flash memories that are especially configured to store and execute program commands. Examples of the program commands include machine language codes created by a compiler, and high-level language codes that may be executed by a computer by using an interpreter. When all or some of a base station or a relay described in the present disclosure is implemented by a computer program, a computer-readable recording medium storing the computer program is also included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a first electronic device in a wireless environment, the method comprising:
   detecting a generation of data within a predetermined time duration before a time set to transmit control information to a second electronic device; and
   in response to detecting of the generation of the data, transmitting, to the second electronic device, the data with the control information before the time.

2. The method of claim 1, further comprising:
   performing a synchronization with the second electronic device by transmitting the control information at the time if the generation of the data is not detected within the predetermined time duration before the time.

3. The method of claim 1, further comprising:
   detecting an update of the control information for an application which needs to be synchronized with the second electronic device.

4. The method of claim 3, further comprising:
   comparing an execution time of the application and a time of the data generated; and transmitting, to the second electronic device, the updated control information at the execution time of the application, if the execution time is prior to the time of the data generated.

5. The method of claim 4, further comprising:
transmitting, to the second electronic device, the data with the updated control information if the time of the data generated is prior to the execution time of the application.

6. The method of claim 1, wherein the predetermined time duration is based on a driving time duration of the second electronic device.

7. An apparatus for an electronic device in a wireless environment, the apparatus comprising:
a transceiver; and
at least one processor configured to:
    detect a generation of data within a predetermined time duration before a time set to transmit control information to a second electronic device, and
    in response to detecting of the generation of the data, transmit, to the second electronic device, the data with the control information before the time.

8. The apparatus of claim 7, wherein the at least one processor is further configured to perform a synchronization with the second electronic device by transmitting the control information at the time if the generation of the data is not detected within the predetermined time duration before the time.

9. The apparatus of claim 7, wherein the processor is further configured to detect an update of the control information for an application which needs to be synchronized with the second electronic device.

10. The apparatus of claim 9, wherein the processor is further configured to:
    compare an execution time of the application and a time of the data generated, and
    transmit, to the second electronic device, the updated control information, at the execution time of the application, if the execution time is prior to the time of the data generated.

11. The apparatus of claim 10, wherein the processor is further configured to transmit, to the second electronic device, the data with the updated control information if the time of the data generated is prior to the execution time of the application.

12. The apparatus of claim 7, wherein the predetermined time duration is based on a driving time duration of the second electronic device.

* * * * *